(12) United States Patent
Hayden et al.

(10) Patent No.: US 9,990,335 B2
(45) Date of Patent: Jun. 5, 2018

(54) UNIVERSAL AND AUTOMATED MONTE CARLO METHOD CODE FOR UNCERTAINTY PROPAGATION IN METROLOGY DATABASES

(71) Applicant: The United States of America as represented by the Administrator of the National Aeronautics and Space Administration, Washington, DC (US)

(72) Inventors: Joseph Hayden, Ellicott City, MD (US); Manal A. Khreishi, Upper Marlboro, MD (US); Theodore A. Hadjimichael, Washington, DC (US); Raymond J. Ohl, Dayton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 44 days.

(21) Appl. No.: 15/193,618

(22) Filed: Jun. 27, 2016

(65) Prior Publication Data

US 2017/0371841 A1    Dec. 28, 2017

(51) Int. Cl.
| | | |
|---|---|---|
| *G06F 1/02* | (2006.01) | |
| *G06F 17/18* | (2006.01) | |
| *G06F 17/14* | (2006.01) | |
| *G06F 7/58* | (2006.01) | |

(52) U.S. Cl.
CPC ............ *G06F 17/18* (2013.01); *G06F 7/58* (2013.01); *G06F 17/145* (2013.01); *G06F 2207/58* (2013.01)

(58) Field of Classification Search
CPC .......... G06F 17/18; G06F 7/58; G06F 17/145
See application file for complete search history.

(56) References Cited

U.S. PATENT DOCUMENTS

| | | | | |
|---|---|---|---|---|
| 5,317,689 A | * | 5/1994 | Nack .................. | G06T 15/06 345/505 |
| 6,539,294 B1 | * | 3/2003 | Kageyama ............ | E02F 3/842 180/168 |
| 2009/0150119 A1 | * | 6/2009 | Ikegami ................ | A63B 71/06 702/179 |
| 2013/0332111 A1 | * | 12/2013 | McLaughlin ........ | G06K 9/6256 702/181 |

* cited by examiner

*Primary Examiner* — Tan V. Mai
(74) *Attorney, Agent, or Firm* — Christopher O. Edwards; Bryan A. Geurts; Mark P. Dvorscak

(57) ABSTRACT

A method of providing transformed target points for integrating a component into an assembly includes collecting a set of component target points, collecting a set of assembly target points, identifying target points common to the set of component target points and the set of assembly target points; performing a specified number of Monte Carlo transformations of selected ones of the common target points to yield a set of transformed target points and vectors and an associated uncertainty value for each transformed target point and vector, and using certain ones of the transformed target points for integrating the component into the assembly based on the associated uncertainty value for each of the transformed target points.

7 Claims, 3 Drawing Sheets

UNIVERSAL AND AUTOMATED MONTE CARLO METHOD CODE FOR UNCERTAINTY PROPAGATION IN METROLOGY DATABASES

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

BACKGROUND

Large volume metrology measurements are conducted at every major phase of alignment and integration of large scale extraterrestrial instruments, for example, the Integrated Science Instrument Module which forms the main payload of the James Webb Space Telescope at NASA Goddard Space Flight Center. Placement of components within large scale assemblies may require precisely locating metrology targets and predicting locations of targets that may be out of view. A network of both ambient and cryogenic metrology measurements may be used to verify that components of the large scale extraterrestrial instrument and ground support equipment conform to the predicted position and orientation at various integration and alignment states. The combining of multiple location and orientation measurements and their uncertainties from the network of different metrology instruments may be accomplished using various data gathering and data analysis tools or programs. The resulting measurements and their uncertainties constitute a metrology calibration database for a particular test configuration.

Best-fit transformations are routinely used in metrology to adjust the position and orientation of points, objects, coordinate systems, and measurement instruments. A best-fit spatial-transformation, however, transforms nominal targets without regard to the uncertainty in those targets. In principle, it is possible to apply hundreds of transformations back-and forth between common targets in two different databases with only negligible round-off error when using double precision operations. In practice, however, there is an accuracy penalty associated with applying a transformation to common measured targets that is dependent on the uncertainty in those targets.

Monte Carlo simulations are routinely used in the aerospace and other industries to explore the sensitivity in the output of complex systems by iteratively varying the input parameters within statistical limits. These complex systems can be mathematical or physical in nature and usually contain multiple coupled degrees of freedom where closed-form solutions are difficult or impossible to obtain. A Monte Carlo approach is well suited to characterizing the sensitivity of transformed 3D-points because of the nonlinearity associated with a composite rotation matrix.

SUMMARY

A specifically developed Monte Carlo Transformation Uncertainty (MCTU) program may be used to robustly propagate, analyze, and book-keep, the uncertainty associated with spatially transforming point targets and unit vectors originating from a variety of different metrology sources.

The MCTU program may primarily be used as a supplement to best-fit transformations, but the simultaneous registration of all instruments and their measurements is most accurately addressed using the network bundle adjustment capability within most commercial metrology software. The bundle adjustment capability is able to optimize the network using the instrument uncertainty and unique point cloud uncertainty fields associated with each target. Uncertainty fields of measurements exported from data gathering and data analysis tools can only be approximated by their constituent axial 95% Confidence Interval (CI) Student's-T uncertainties. This approximation will be accurate to the extent that the composite uncertainty field within the data gathering and data analysis tool is ellipsoidal with major and minor axes aligned to the coordinate system. Most target uncertainty fields for large scale instrument metrology measurements are generally spherical as a result of the symmetric placement of multiple laser trackers and laser radar stations.

Often, however, metrology measurements and their uncertainty statements originate from multiple independent measurement sources. Measurements may have been provided by a vendor or a calibration facility, or they may have originated from independent measurement instruments such as: theodolites, coordinate measuring machines, or photogrammetry cameras. The MCTU method according to the disclosed embodiments provides a relatively fast and structured approach to propagating uncertainty in databases with common targets that reside outside of a metrology software environment.

In at least one exemplary embodiment, a method of providing transformed target points for integrating a component into an assembly includes collecting a set of component target points, collecting a set of assembly target points, identifying target points common to the set of component target points and the set of assembly target points, performing a specified number of Monte Carlo transformations of selected ones of the common target points to yield a set of transformed target points and an associated uncertainty value for each transformed target point, and using certain ones of the transformed target points for integrating the component into the assembly based on the associated uncertainty value for each of the transformed target points.

The method may include using a networked set of metrology instruments to collect the component target point and assembly target point sets.

The method may include determining the selected ones of the common target points based on residuals of a best fit transformation between the common target points.

Performing the specified number of Monte Carlo transformations may include calculating N-random 95% CI uncertainties for each of the selected common target points.

The N-random 95% CI uncertainties may be calculated for each selected common target using a random number generator that draws from a Student's-T probability distribution function.

The Students-T distribution function is a function of degrees-of-freedom of each for each selected common target and the probability, P, which is 0.05 for 95% CI The Student's-T probability distribution function may be scaled by the X, Y, and Z 95% CI uncertainties specified for each selected common target point.

In another exemplary embodiment, an apparatus for transforming target points for integrating a component into an assembly includes a metrology system for measuring a set of component target points and a set of assembly target points, and a computer operable to identify target points common to the set of component target points and the set of assembly target points, perform a specified number of Monte Carlo transformations of selected ones of the common target points to yield a set of transformed target points and vectors with associated uncertainty value for each transformed target point or vector, and using certain ones of the transformed target points for integrating the component into the assembly based on the associated uncertainty value for each of the transformed target points.

The metrology system may include a networked set of metrology instruments for measuring the component target point and assembly target point sets.

The computer is operable to determine the selected ones of the common target points based on residuals of a best fit transformation between the common target points.

The computer may be operable to perform the specified number of Monte Carlo transformations by calculating N-random 95% CI uncertainties for each of the selected common target points.

The computer may be operable to calculate the N-random 95% CI uncertainties for each selected common target using a random number generator that draws from a Student's-T probability distribution function.

The computer may be operable to scale the Student's-T probability distribution function by the X, Y, and Z 95% CI uncertainties specified for each selected common target point.

BRIEF DESCRIPTION OF THE DRAWINGS

The foregoing aspects and other features of the embodiments are explained in the following description, taken in connection with the accompanying drawings, wherein.

DETAILED DESCRIPTION

As mentioned above, a custom MCTU error propagation routine has been developed to robustly propagate, analyze, and book-keep, the uncertainty associated with spatially transforming targets and unit vectors between databases with common targets. The MCTU error propagation routine generates N-different geometric best-fit transformations between two separate databases with at least 3 corresponding targets. Each of the geometric transformations involves simulating target measurements from the sum of the nominal targets and their randomly-drawn uncertainties. The randomly-drawn uncertainties are defined by the Student's-T probability density functions (PDF) for each of the targets in the databases. The 2-sigma standard deviation is calculated for all targets in the N-simulated Monte Carlo transformations. The Monte Carlo error propagation method has been shown to be beneficial for propagating uncertainty through multiple large scale instrument databases and for estimating transformation uncertainty for line-of-sight modeling scenarios where one or more targets may be omitted from a best-fit transformation.

Figure 1:
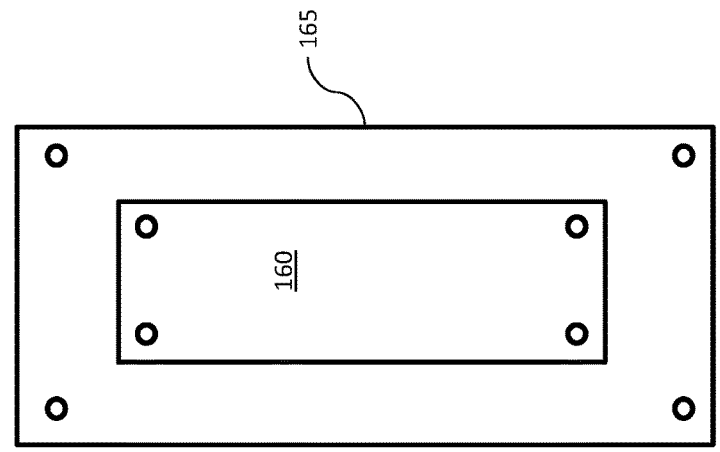
FIG. 1 shows an embodiment of an exemplary metrology system incorporating the MCTU program according to the disclosed embodiments.
Figure 1:
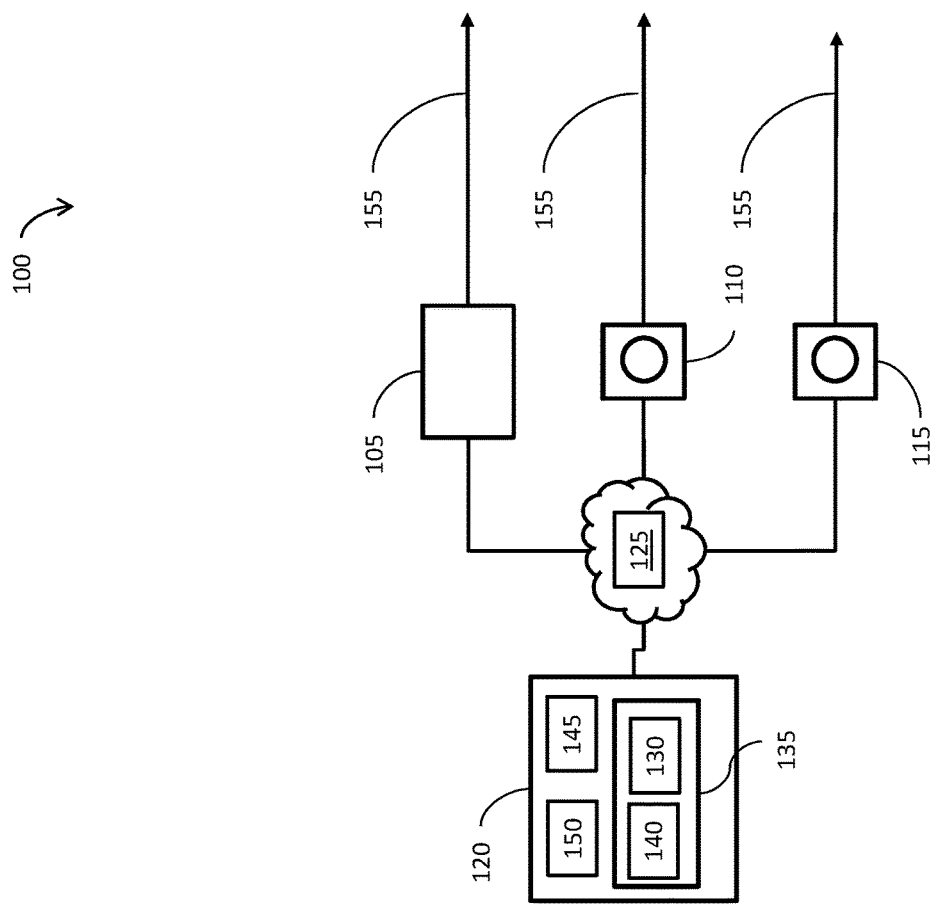

FIG. 1 illustrates one embodiment of an exemplary measurement system 100 incorporating the MCTU program. Although the disclosed embodiments will be described with reference to the embodiments shown in the drawings and described below, it should be understood that these could be embodied in many alternate forms. In addition, any suitable size, shape or type of elements or materials could be used.

The system 100 may include a metrology system having a number of metrology instruments 105, 110, 115 which may include one or more laser radar systems, coordinate measuring machines, optical cameras, laser trackers, theodolites, or any other suitable instruments for implementing the disclosed embodiments. The metrology instruments 105, 110, 115 may be connected to a computer 120 through a network 125. The computer 120 may operate under the control of one or more programs in the form of computer readable program code 130 stored on at least one computer readable medium 135. The computer readable program code 130 stored on the at least one computer readable medium 135 may be implemented for carrying out and executing the operations of the metrology system 100 described herein. The computer readable medium 135 may be a memory of the computer 120. It should be understood that the computer readable medium 135 may store one or more operations for controlling the metrology instruments 105, 110, 115, for storing metrology data, and for operating the MCTU error propagation routine or program. The computer readable medium 135 may also include one or more databases 140, including a metrology database and other databases for storing measurement data, results of the MCTU error propagation program, and any other suitable data.

Computer 120 may also include a microprocessor 145 for executing the computer readable program code 130 stored on the at least one computer readable medium 135. In at least one aspect, computer 120 may include one or more input or output devices, generally referred to as a user interface 150 which may operate to allow input to the computer 120 or to provide output from the computer 120. The metrology instruments 105, 110, 115 may emit measurement beams 155 directed to an instrument 160 and an assembly 165 into which the instrument 160 is being integrated.

The metrology database 140 may include average point targets and average unit vectors along with their corresponding uncertainty statements for a specific test configuration. A test configuration may include different test environments, different load conditions, different orientations, or could be identical in all respects to a previous test configuration but conducted at a later date. The metrology database may represent an official record of the metrology survey for a particular test configuration and is usually the final step in the metrology analysis process.

As mentioned above, a typical metrology survey may include multiple laser tracker stations, laser radar stations, and theodolites. The data gathering and data analysis tool may be used to bundle measurements from all the metrology survey equipment. When the measurements are all bundled, all instruments and their measurements may be transformed to a reference coordinate system. All measurements in the network, along with all associated planes and unit vectors, may then be exported from the data gathering and data analysis tool to an ASCII file. The ASCII file may be read into the MCTU program and the average and 95% Student's-T CIs may be calculated for all common point targets and unit vectors. Outlier targets deactivated during the measurement bundling process may be ignored when calculating the average and Student's-T uncertainties in the MCTU program. Each of the target names, target types, number of samples, position or direction, and uncertainties may be exported, for example as a data file, or as another example, as an Excel formatted spreadsheet.

Database targets and uncertainties for this work use a "P", "Q", "Pt", and "QPt" nomenclature, where targets of a component, for example, instrument 160, collected by the metrology instruments 105, 110, 115 are designated P-targets and are always best-fit transformed to the Q-targets in the reference coordinate system of an assembly, for example assembly 165, into which the component is being integrated, to determine the Pt targets and their uncertainties. The term "involved target" refers to a point target that is used directly in the Monte Carlo best-fit transformations. The term "uninvolved target" refers to targets that are not used in the best-fit transformation, either because there are no common targets between P and Q, or because the user has intentionally uninvolved that target. Unit vectors are always treated as uninvolved targets and are only rotated by the best-fit rotation matrix. Sample P-, Q-, and Pt-database files containing both points and direction cosines are shown in Tables 1(a)-(c) with a corresponding graphical representation in FIG. 1. At the completion of the Monte Carlo transformations the resulting database can be saved using either Q-priority, Pt-priority, or lowest uncertainty priority.

The Q-priority database method gives Q-targets and their uncertainties precedence in the final QPt-database over the corresponding transformed Pt-targets and their uncertainties. If a Pt-target does not have a corresponding Q-target then that Pt target is used in the database. The Pt-priority gives Pt targets precedence in the final QPt-database over corresponding Q targets. The lowest uncertainty priority database method gives the Q- or Pt-target with the lower uncertainty magnitude precedence in the final QPt-database.

The Q-priority is commonly used to tie-in a more comprehensive set of P-targets to more recently measured Q-targets, but does not permit Pt-targets to overwrite corresponding Q targets. The Pt-priority is used to transform more recently measured P-targets back to a reference coordinate system established by the Q-targets and does permit overwriting of Q-targets by corresponding Pt-targets. The minimum uncertainty priority is used to tie-in P-targets to more recently measured Q-targets and permits over-writing of Q-targets where corresponding Pt-target uncertainties are lower.

Tables 1a-1c show sample metrology database files for P-targets (1a), Q-targets (1b), and Pt-targets (1c), with average and Student's-T 95% CI uncertainties. The resulting database with nominal values and Monte Carlo uncertainties is formed from the Q- and Pt-targets using Q-priority, Pt-priority, or lowest uncertainty priority database export methods.

TABLE 1a

P-Targets (MCTU Input File)

| Target Name | Target Type (1 = Point, 2 = DC) | N-Samples | Average Target Position (mm) or Direction Cosine | | | 95% Student's-T Confidence Interval | | | |
|---|---|---|---|---|---|---|---|---|---|
| | | | X | Y | Z | dX | dY | dZ | dMag |
| P1 | 1 | 5 | −0.0003 | 0.0008 | 0.0002 | 0.0001 | 0.0003 | 0.0002 | 0.0004 |
| P2 | 1 | 5 | 0.0006 | 50.0005 | 0.0004 | 0.0005 | 0.0003 | 0.0001 | 0.0006 |
| P3 | 1 | 5 | 50.0001 | 0.0001 | 0.0010 | 0.0010 | 0.0007 | 0.0002 | 0.0012 |
| P4 | 1 | 5 | 0.0010 | −49.9992 | 0.0009 | 0.0008 | 0.0020 | 0.0010 | 0.0024 |
| P5 | 1 | 5 | −49.9996 | 0.0004 | 0.0003 | 0.0008 | 0.0009 | 0.0020 | 0.0023 |
| P6 | 1 | 5 | 0.0000 | 62.5001 | 0.0001 | 0.0003 | 0.0007 | 0.0003 | 0.0008 |
| P7 | 2 | 5 | −0.707100 | −0.707100 | 0.000000 | 0.000300 | 0.000600 | 0.000200 | 0.000700 |
| P8 | 2 | 5 | −0.707100 | 0.707100 | 0.000000 | 0.000300 | 0.000600 | 0.000200 | 0.000700 |

TABLE 1b

Q-Targets (MCTU Input File)

| Target Name | Target Type (1 = Point, 2 = DC) | N-Samples | Average Target Position (mm) or Direction Cosine | | | 95% Student's-T Confidence Interval | | | |
|---|---|---|---|---|---|---|---|---|---|
| | | | X | Y | Z | dX | dY | dZ | dMag |
| Q1 | 1 | 5 | 0.0007 | 0.0002 | −0.0009 | 0.0008 | 0.0004 | 0.0090 | 0.0090 |
| Q2 | 1 | 6 | 0.0005 | 50.0004 | 0.0010 | 0.0008 | 0.0010 | 0.0080 | 0.0081 |
| Q3 | 1 | 4 | 50.0009 | −0.0004 | 0.0006 | 0.0006 | 0.0006 | 0.0007 | 0.0011 |
| Q4 | 1 | 7 | 0.0009 | −49.9996 | 0.0003 | 0.0019 | 0.0010 | 0.0002 | 0.0022 |
| Q5 | 1 | 4 | −49.9996 | 0.0000 | 0.0009 | 0.0004 | 0.0019 | 0.0003 | 0.0020 |
| Q7 | 7 | 5 | −0.707100 | −0.707100 | 0.0000 | 0.0008 | 0.0007 | 0.0007 | 0.0013 |

TABLE 1c

Pt-Targets (MCTU Output)

| Target Name | Target Type (1 = Point, 2 = DC) | N-Samples | Average Target Position (mm) or Direction Cosine | | | 95% Student's-T Confidence Interval | | | |
|---|---|---|---|---|---|---|---|---|---|
| | | | X | Y | Z | dX | dY | dZ | dMag |
| Pt1 | 1 | 1000 | 0.0000 | 0.0004 | 0.0000 | 0.0008 | 0.0010 | 0.0032 | 0.0034 |
| Pt2 | 1 | 1000 | 0.0009 | 50.0001 | 0.0008 | 0.0012 | 0.0010 | 0.0074 | 0.0076 |
| Pt3 | 1 | 1000 | 50.0004 | −0.0003 | 0.0003 | 0.0013 | 0.0013 | 0.0033 | 0.0038 |
| Pt4 | 1 | 1000 | 0.0013 | −49.9996 | 0.0001 | 0.0015 | 0.0023 | 0.0041 | 0.0050 |
| Pt5 | 1 | 1000 | −49.9993 | 0.0000 | 0.0006 | 0.0012 | 0.0017 | 0.0032 | 0.0038 |
| Pt6 | 1 | 1000 | 0.0004 | 62.4997 | 0.0007 | 0.0015 | 0.0014 | 0.0086 | 0.0089 |
| Pt7 | 2 | 1000 | −0.7071 | −0.7071 | 0.0000 | 0.0004 | 0.0009 | 0.0003 | 0.0010 |
| Pt8 | 2 | 1000 | −0.7071 | 0.7071 | 0.0000 | 0.0004 | 0.0011 | 0.0003 | 0.0012 |

Figure 2:
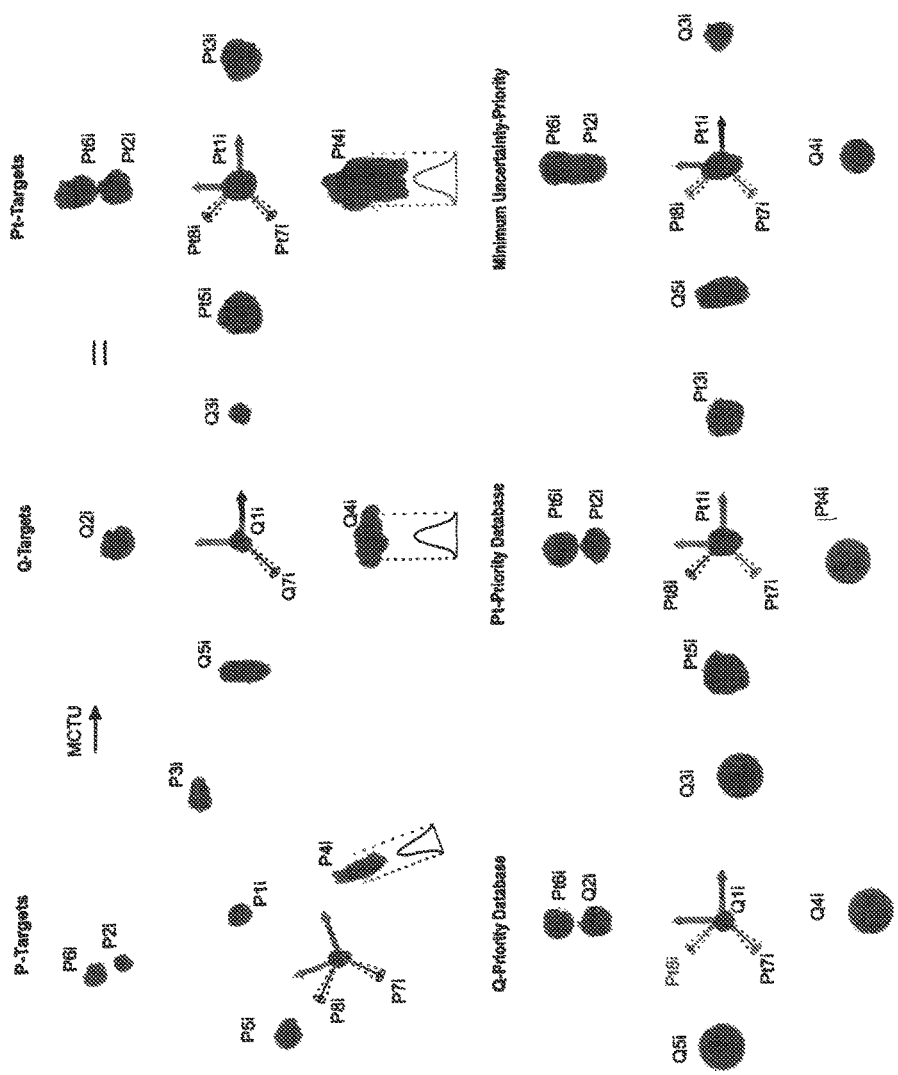
FIG. 2 shows a graphical display of database targets and uncertainties and different database export types according to the disclosed embodiments.

The top half of FIG. 2 shows a graphical display of P-targets, Q-targets, and Pt-targets, while the bottom half of FIG. 2 shows three types of database export types: Q-priority, Pt-priority, and minimum uncertainty priority.

The MCTU program was developed as a method of propagating uncertainty when transforming one database to another using common targets and their uncertainties. The following least-squares problem:

$$\min \sum_{i=1}^{N} \|R_i(P_i + \Delta P_i) + d_i - (Q_i + \Delta Q_i)\|^2$$

is used to determine the rotation matrix $R_i$ and the translation vector $d_i$ that maps $P_i + \Delta P_i$ targets to the corresponding $Q_i + \Delta Q_i$ targets for each of N-Monte Carlo transformation iterations. The best-fit transformation routine used for the nominal and Monte Carlo transformations employs the Singular Value Decomposition optimization method to solve the Orthogonal Procrustes problem. The Singular Value Decomposition method is used because it offers a mature, fast, closed-form solution to least-squares fitting to solve for absolute orientation.

Figure 3:
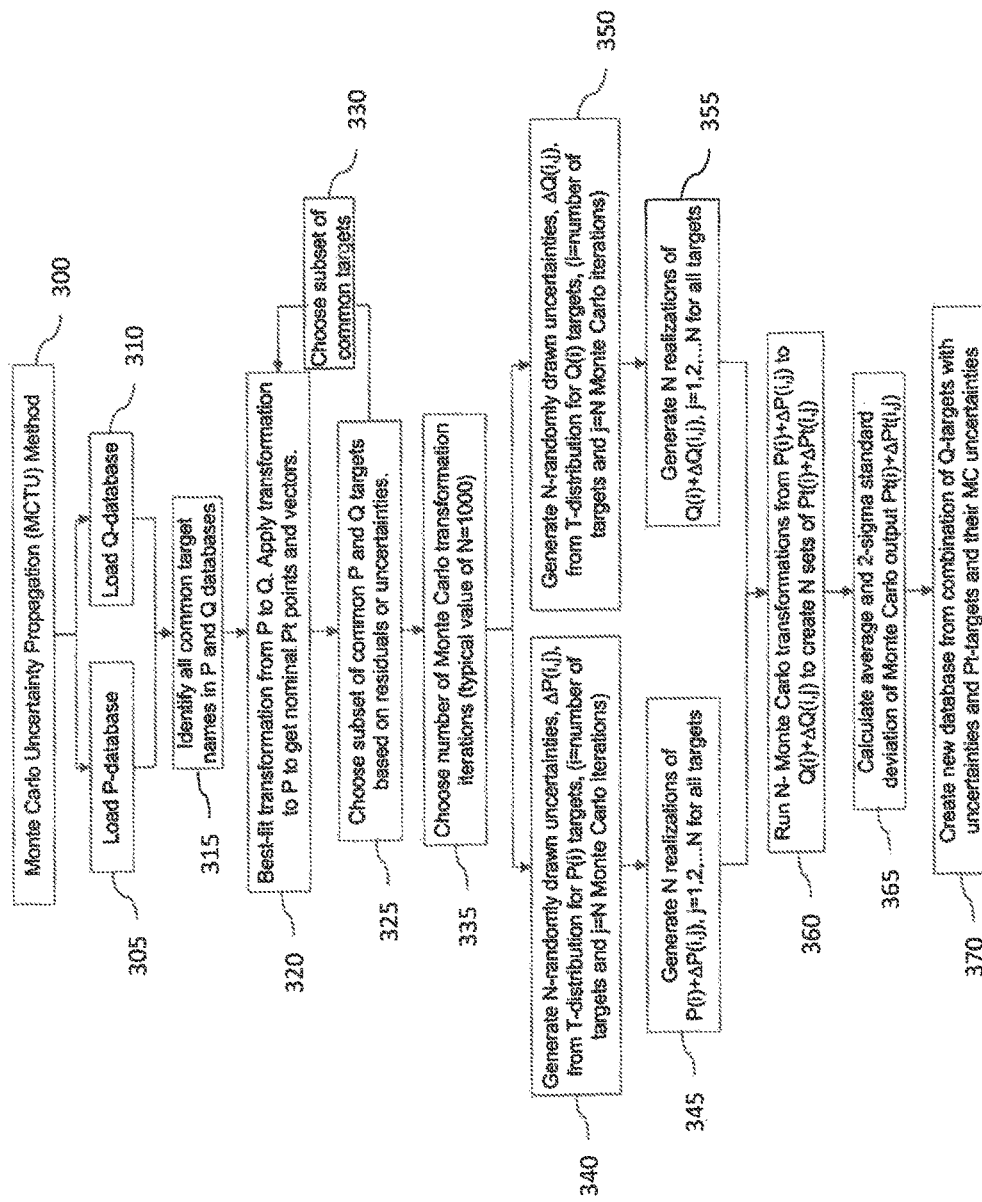
FIG. 3 shows a flow diagram for the MCTU process.

The first step in the MCTU program flow 300, shown in FIG. 3, is to load a P-database file of targets collected from the component, as shown in block 305, and load a Q-database file of targets collected from the assembly, as shown in block 310. The program then identifies all point targets common to the two files that could be used in the Monte Carlo transformations are identified as shown in block 315. An initial best-fit transformation is done between the nominal P- and Q-targets to calculate the residuals' as shown in block 320, and to identify common target names that will be involved in the Monte Carlo transformations, as shown in blocks 325 and 330. The user has the option of uninvolving common outlier targets identified in the residuals prior to running the Monte Carlo transformations. The user may specify the number of Monte Carlo transformations N to be used, as shown in block 335. As an example, N=1,000 has been shown to produce stable results in the uncertainty of the transformed targets, however, it should be understood that any number of transformations may be used. Then N-random 95% CI uncertainties are calculated for each target using a random number generator that draws from a Student's-T probability distribution function (PDF) scaled by the X, Y, and Z 95% CI uncertainties specified in the database for each target of the set of P targets, as shown in blocks 340, 345, and 360, and the set of Q targets, as shown in blocks 350, 355, and 360. The Students-T distribution is a function of the degrees-of-freedom and probability, where the degrees of freedom for each target are also obtained from the database. A Student's-T distribution is used, rather than a normal distribution, since the use of random numbers from a normal PDF results in an underestimation of the 95% CI when limited samples are involved. The Student's-T uncertainty may be calculated as $t\sigma/\sqrt{N-1}$, where t is the Student's-T "t-value", $\sigma$ is the sample standard deviation, and N is the number of samples. The t-value is calculated from a tiny function defined as tinv(P,v), where P=1−0.05/2 for the 95% CI of the 2-tailed T-distribution, and the degrees of freedom, v, are defined as v=N−1. The sample standard deviation, $\sigma$, is defined as:

$$\sigma = \left( \frac{1}{N-1} \sum_{i=1}^{N} (x_i - \bar{x})^2 \right)^{1/2}$$

where $x_i$ is the i-th sample and $\bar{x}$ is the average of the samples.

At the completion of the N-Monte Carlo transformations, the average 6-DOF rigid body transformation and 2 sigma standard deviation of all Pt-targets are calculated, as shown in block 365. The standard deviation may be used rather than Student's-T 95% CI since the two distributions converge for large numbers of Monte Carlo simulations. A new database is created from a combination of the Q targets with uncertainties and the Pt targets and their Monte Carlo uncertainties, as shown in block 370.

Certain Pt targets may then be chosen, based on their uncertainties as targets for integrating the component into the assembly.

Run times for the MCTU program may vary depending on computer processing speed, memory capacity and memory read/write speed. Exemplary run times may range from approximately 15 seconds for 10 targets to approximately 2 minutes for several hundred targets on a 64-bit Windows 7 computer, using 1,000 Monte Carlo transformations. The nominal transformed targets and average of all Monte Carlo transformations typically agree to within 1 um, so values from the nominal transformation are usually used in the database for consistency in transformed results.

The custom MCTU program has been used extensively during integration and testing of the Integrated Science Instrument Module to estimate and propagate the uncertainty in metrology databases. Multiple ambient and cryogenic databases have been constructed from metrology surveys on: ground support equipment such as the BALL Image Analyzer (BIA) sensor head, alignment fixtures such as the Master Alignment Test Fixture (MATF) and Integrated Alignment Test Fixture (IATF), and flight hardware such as the Integrated Science Instrument Module. The MCTU program offers a robust approach to characterizing and propagating the uncertainty in transformed metrology database targets based on the uncertainty in a rigid body constellation of targets involved in the transformation.

The MCTU program rigorously propagates uncertainty in targets and vectors from multiple independent metrology sources or instruments using Monte Carlo spatial transformations between common targets; reports 6-DOF rigid body uncertainties and individual target and vector uncertainties of the transformed database; displays nominal, average, and Monte Carlo transformation results; multiple graphical display options to visual target and vector uncertainty; and customized MCTU reporting to an Excel spreadsheet.

It is important to note that while the MCTU program offers a more comprehensive approach to propagating uncertainty in metrology databases than simply root-sum-squaring error terms, it is not as comprehensive an approach to uncertainty propagation as a full network bundle adjustment. A network bundle adjustment, such as the USMN in the metrology data gathering and data analysis tool, has access to composite uncertainty fields for every measurement. When possible, it is preferable to apply transformations within the framework of a network bundle adjustment since the exact point cloud information will be considered in the adjustment.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An apparatus for transforming target points for integrating a component into an assembly comprising:
    a metrology system for measuring a set of component target points and a set of assembly target points; and
    a computer operable to:
        identify target points common to the set of component target points and the set of assembly target points;
        perform a specified number of Monte Carlo transformations of selected ones of the common target points to yield a set of transformed target points and an associated uncertainty value for each transformed target point; and
        using certain ones of the transformed target points for integrating the component into the assembly based on the associated uncertainty value for each of the transformed target points.

2. The apparatus of claim 1, wherein the metrology system includes a networked set of metrology instruments for measuring the component target point and assembly target point sets.

3. The apparatus of claim 1, wherein the computer is operable to determine the selected ones of the common target points based on residuals of a best fit transformation between the common target points.

4. The apparatus of claim 1, wherein the computer is operable to perform the specified number of Monte Carlo transformations by calculating N-random 95% CI uncertainties for each of the selected common target points.

5. The apparatus of claim 1, wherein the computer is operable to calculate the N-random 95% confidence interval (CI) uncertainties for each selected common target using a random number generator that draws from a Student's-T probability distribution function.

6. The apparatus of claim 5, wherein the Students-T distribution function is a function of degrees-of-freedom and a probability of each selected common target.

7. The apparatus of claim 5, wherein the computer is operable to scale the Student's-T probability distribution function by the X, Y, and Z 95% CI uncertainties specified for each selected common target point.

* * * * *

UNITED STATES PATENT AND TRADEMARK OFFICE
CERTIFICATE OF CORRECTION

PATENT NO. : 9,990,335 B2  
APPLICATION NO. : 15/193618  
DATED : June 5, 2018  
INVENTOR(S) : Joseph Hayden et al.

Page 1 of 1

It is certified that error appears in the above-identified patent and that said Letters Patent is hereby corrected as shown below:

On the Title Page

Inventor Theodore A. Hadjimichael middle initial should be changed to "J"
Inventor Raymond J. Ohl middle initial should be changed to "G"

Signed and Sealed this
Eleventh Day of December, 2018

Andrei Iancu
*Director of the United States Patent and Trademark Office*